United States Patent
Pearson et al.

(10) Patent No.: US 10,194,339 B1
(45) Date of Patent: *Jan. 29, 2019

(54) DETECTION OF BASE STATION SYNCHRONIZATION FAILURE

(71) Applicant: Sprint Communications Company L.P., Overland Park, KS (US)

(72) Inventors: Timothy Hugh Pearson, Overland Park, KS (US); Roger Danforth Bartlett, Merriam, KS (US); Steven Kenneth Guthrie, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/402,372

(22) Filed: Jan. 10, 2017

Related U.S. Application Data

(63) Continuation of application No. 14/572,241, filed on Dec. 16, 2014, now Pat. No. 9,591,498, which is a
(Continued)

(51) Int. Cl.
*H04W 56/00* (2009.01)
*H04L 27/26* (2006.01)
*H04B 7/12* (2006.01)
*H04W 24/08* (2009.01)
*H04W 24/04* (2009.01)
*H04L 5/14* (2006.01)

(52) U.S. Cl.
CPC ......... *H04W 24/04* (2013.01); *H04W 56/001* (2013.01); *H04L 5/14* (2013.01)

(58) Field of Classification Search
None
See application file for complete search history.

(56) References Cited

U.S. PATENT DOCUMENTS

| | | |
|---|---|---|
| 5,239,748 A | 8/1993 | Hamilton |
| 6,239,748 B1 | 5/2001 | Gilhousen |

(Continued)

OTHER PUBLICATIONS

BTS—Base Transceiver Station, Newton's Telecom Dictionary, 27th Edition, 2013. p. 188.
CDMA—Code Division Multiple Access, Newton's Telecom Dictionary, 27th Edition, 2013, p. 311.
EVDO—Enhanced Voice-Data Optimized, Newton's Telecom Dictionary, 27th Edition, 2013, p. 479.
GPS—Global Positioning System, Newton's Telecom Dictionary, 27th Edition, 2013, pp. 560-561.
(Continued)

*Primary Examiner* — Candal Elpenord

(57) ABSTRACT

Methods and systems are provided for enabling a base station to receive signals and synchronization information from neighboring base stations over a frequency band designated for transmissions to mobile devices. In embodiments, a cancellation signal is used to cancel antenna overload resulting from a base station's own transmission. By negating antenna overload, the base station may listen for synchronization signals output by neighboring base stations over the frequency band designated for transmission to mobile devices, such as a downlink band, for example. In embodiments, synchronization signals are used by the base station and/or a server to detect when synchronization failures occur at the base station and/or neighboring base stations. Synchronization signals from a neighboring base station may be used to re-synchronize a base station that have experience such a failure, in some embodiments.

20 Claims, 13 Drawing Sheets

Related U.S. Application Data continuation-in-part of application No. 14/314,928, filed on Jun. 25, 2014, now Pat. No. 9,565,646.

(56) References Cited

U.S. PATENT DOCUMENTS

| | | | |
|---|---|---|---|
| 8,300,801 B2 | 10/2012 | Sweeney et al. | |
| 2001/0038674 A1 | 11/2001 | Trans | |
| 2002/0004398 A1 | 1/2002 | Ogino et al. | |
| 2002/0064234 A1 | 5/2002 | Kaku et al. | |
| 2002/0181627 A1* | 12/2002 | Wengler | H01Q 9/28 375/347 |
| 2006/0084441 A1* | 4/2006 | Dowling | H04W 24/04 455/445 |
| 2007/0182614 A1* | 8/2007 | Inoue | H04M 9/082 341/144 |
| 2007/0253355 A1* | 11/2007 | Hande | H04W 16/06 370/328 |
| 2007/0297323 A1 | 12/2007 | Seki | |
| 2008/0225759 A1 | 9/2008 | Morita et al. | |
| 2009/0088172 A1* | 4/2009 | Lusky | H04W 56/0005 455/446 |
| 2011/0312339 A1 | 12/2011 | Kuningas et al. | |
| 2012/0140658 A1* | 6/2012 | Kanzaki | H04B 7/0426 370/252 |
| 2013/0237218 A1* | 9/2013 | Li | H04W 48/16 455/434 |
| 2014/0179223 A1 | 6/2014 | Sessink et al. | |
| 2014/0185429 A1 | 7/2014 | Takase et al. | |
| 2014/0194073 A1 | 7/2014 | Wyville et al. | |

OTHER PUBLICATIONS

GSM—Global System for Mobile Communications, Newton's Telecom Dictionary, 27th Edition, 2013, pp. 570-571.

HRPD—High-Rate Packet Data Services and Their Operation Analysis, ZTE Corporation, Nov. 10, 2004, 4 pages. http://wwwen.zte.com.cn/endata/magazine/ztetechnologies/2004year/no16/art-icles/200411/t20041110.sub.--161417.html.

EHRPD—Enhanced High Rate Packet Data, SPIRENT, Tech Forum, CDMA Seminar 2009, 27 pages. Last Accessed Aug. 26, 2016 www.cdg.org/news/events/CDMASeminar/09.sub.--TechForum.sub.--Sept/present-ations/5-Spirent-ehrpd.sub.-9.sub.--handouts.pdf.

LTE—Long Term Evolution and LTE-A—Long Term Evolution Advanced, Newton's Telecom Dictionary, 27th Edition, 2013, p. 732.

RNC—Radio Network Controller, Wikipedia, 3 pages. Last Accessed Aug. 29, 2016 https://en.wikipedia.org/wiki/Radio.sub.-Network.sub.-Controller.

SyncE—Synchronous Ethernet, Wikipedia, 6 pages. Last Accessed Aug. 26, 2016 https://en.wikipedia.org/wiki/Synchronous.sub.

TDM—Time-Division Multiplexing, Newton's Telecom Dictionary, 27th Edition, 2013, p. 1193.

WAN—Wide Area Network, Newton's Telecom Dictionary, 27th Edition, 2013, pp. 1288-1289.

WiFi—Wireless Fidelity, Newton's Telecom Dictionary, 27th Edition, 2013, p. 1302.

WiMAX—Worldwide Interoperability for Microwave Access, Newton's Telecom Dictionary, 27th Edition, 2013, p. 1305.

ENodeB—Evolved Node B, Wikipedia, 2 pages. Last Accessed Aug. 26, 2016 https://en.wikipedia.org/wiki/EnodeB.

* cited by examiner

| Tracked Referenced Paired Sites | Initial Measured Data | Collected Data | Delta | Flag/Alarm |
|---|---|---|---|---|
| A-B | $X_{A-B}$ | $X'_{A-B}$ | $\Delta = X'_{A-B} - X_{A-B}$ | |
| B-C | $X_{B-C}$ | $X'_{B-C}$ | $\Delta = X'_{B-C} - X_{B-C}$ | |
| B-A | $X_{B-A}$ | $X'_{B-A}$ | $\Delta = X'_{B-A} - X_{B-A}$ | |
| C-B | $X_{C-B}$ | $X'_{C-B}$ | $\Delta = X'_{C-B} - X_{C-B}$ | |
| A-C | $X_{A-C}$ | $X'_{A-C}$ | $\Delta = X'_{A-C} - X_{A-C}$ | |
| C-A | $X_{C-A}$ | $X'_{C-A}$ | $\Delta = X'_{C-A} - X_{C-A}$ | |

DETECTION OF BASE STATION SYNCHRONIZATION FAILURE

CROSS-REFERENCE TO RELATED APPLICATIONS

This application is a continuation of U.S. patent application Ser. No. 14/572,241, filed on Dec. 16, 2014 and titled "Detection of Base Station Synchronization Failures", which is a continuation in part of U.S. patent application Ser. No. 14/314,928, filed on Jun. 25, 2014 and titled "Detection of Base Station Synchronization Failures", the disclosures of which are incorporated by reference herein in their entirety.

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, methods and systems for detecting when a base station, such as an eNodeB, has a synchronization failure. Because a synchronization failure at a base station can be destabilizing to a wireless communications network, especially when other base stations are affected, embodiments enable fast detection when a synchronization failure occurs. The exact base station having the synchronization failure can be quickly identified. A server collects synchronization data, such as phase offsets, from the base stations in the network, and periodically compares this data to control data to determine when a difference, or a delta, exceeds a predetermined threshold. In some embodiments, when two or more deltas associated with the same base station exceed a predetermined threshold, it may be determined that the base station has a synchronization failure.

Further, this disclosure describes a method for enabling a base station to listen to a neighboring base station in order to detect a synchronization failure. By determining an in phase inverse amplitude, the base station cancels out the effects of the base station's own transmission signal, and therefore the base station may listen for transmissions from neighboring bases stations, including transmissions having synchronization data.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
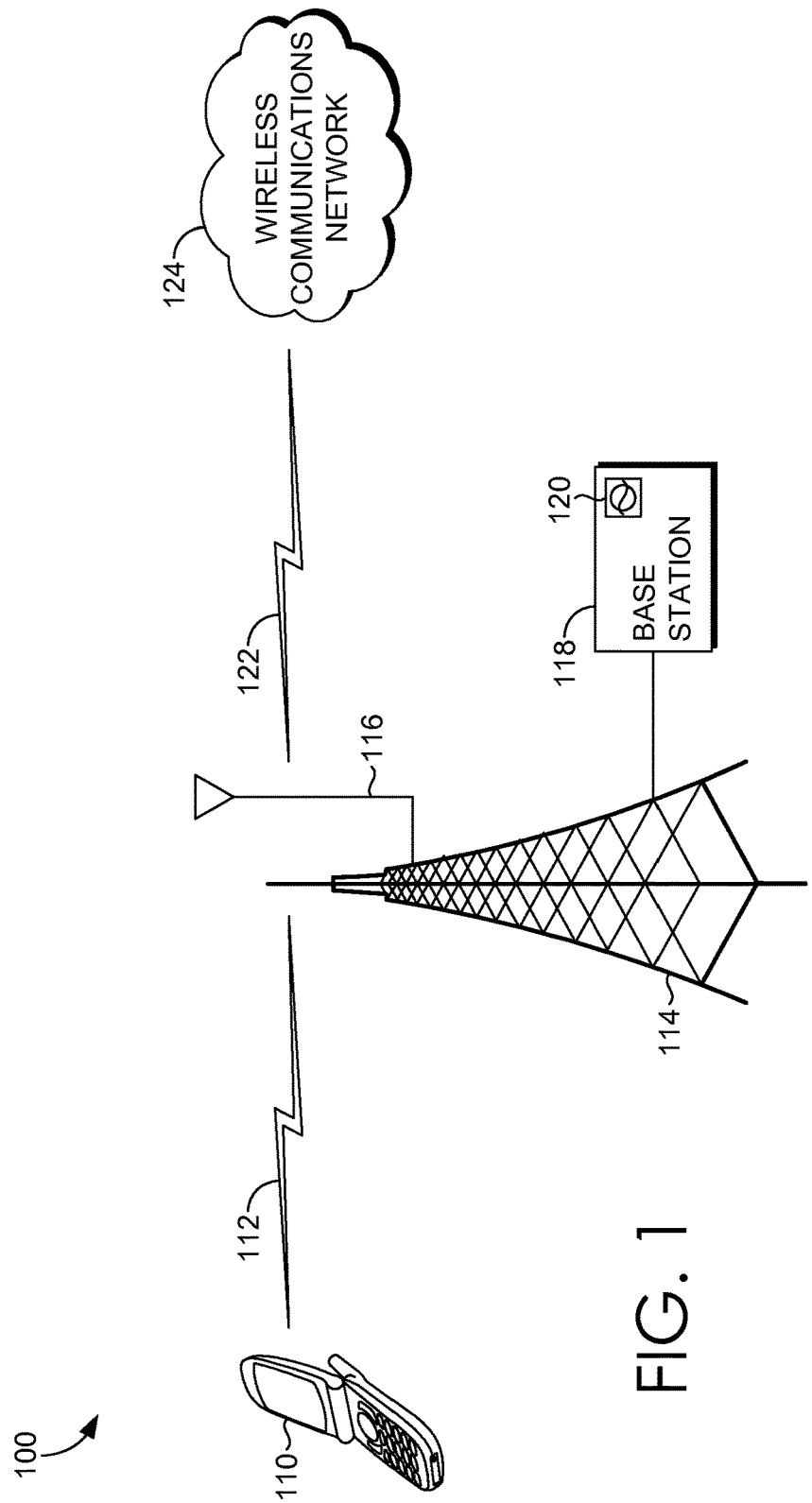
FIG. 1 depicts an exemplary networking environment for carrying out embodiments of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| BTS | Base Transceiver Station |
| CDMA | Code Division Multiple Access |
| eNodeB | Evolved Node B |
| EVDO | Evolution-Data Optimized |
| GPS | Global Positioning System |
| GSM | Global System for Mobile Communications |
| HRPD | High Rate Packet Data |
| eHRPD | Enhanced High Rate Packet Data |
| LTE | Long Term Evolution |
| LTE-A | Long Term Evolution Advanced |
| RNC | Radio Network Controller |
| SyncE | Synchronous Ethernet |
| TDM | Time-Division Multiplexing |
| WAN | Wide Area Network |
| WiMAX | Worldwide Interoperability for Microwave Access |

Further, various technical terms are used throughout this description. A definition of such terms can be found in, for example, Newton's Telecom Dictionary by H. Newton, 27th Edition (2013). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVDs), holographic media or other optical disc storage, magnetic cassettes, magnetic tape, magnetic disc storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As mentioned, embodiments of the present invention are directed toward detecting a synchronization failure in a base station when, for example, the base station has an antenna failure and is no longer able to receive GPS signals for synchronization. The base stations, in embodiments, are able to listen for synchronization data from other base stations within listening range to compute a phase offset between the two base stations. As used herein, synchronization data may include, for example, frequency and/or phase information. Upon request from a server in the wireless communications network, each base station sends synchronization data for various other base stations, such as those that are located within a distance that allows for the two base stations to communicate, or at least listen for each other's synchronization data. The synchronization data is populated into a table by the server. For example, if there are three base stations in the network and all are able to listen for each other's frequency, the first base station would provide two sets of synchronization data—one between the first and second base stations, and one between the first and third base stations. The server runs an algorithm that calculates a difference between each synchronization data and the corresponding control data. This difference, or delta, allows the server to determine when a base station has a synchronization failure, as the absolute value of the delta or a percentage difference may exceed a predetermined threshold.

Additionally, embodiments of the present invention are directed enabling a base station to listen to a neighboring base station in order to detect a synchronization failure. By determining an in-phase inverse amplitude, the base station cancels out the effects of the base station's own transmission signal to itself, and therefore the base station may listen for transmissions from neighboring bases stations, including transmissions having synchronization data.

In a first aspect of the present invention, a method is provided for detecting a synchronization failure of a base station in a wireless communications network. The method includes receiving, at a server in the wireless communications network, synchronization data from one or more base stations in the wireless communication network, the synchronization data comprising a phase offset between two base stations. Further, the method includes computing a difference between each of the received synchronization data and the corresponding control data, and determining if the difference between one or more of the received synchronization data and the corresponding control data is outside of a predetermined threshold. If the difference between one or more of the received synchronization data and the corresponding control data is outside of the predetermined threshold, the method includes identifying the base station of the one or more base stations that has the synchronization failure.

In a second aspect of the present invention, computer-readable media having computer-executable instructions embodied thereon are provided that, when executed, perform a method for detecting a synchronization failure of a base station in a wireless communications network. The method includes, at a first base station, listening for synchronization data from a second base station, and receiving the synchronization data from the second base station. Further, the method includes computing a phase offset using the synchronization data from the second base station and the synchronization data from the first base station, and communicating the phase offset to a server in the wireless communications network for detection of the synchronization failure of at least the first base station and the second base station.

In a third aspect of the present invention, computer-readable media having computer-executable instructions embodied thereon are provided that, when executed, perform a method for detecting a synchronization failure of a base station in a wireless communications network. The method includes receiving synchronization data from a first base station in a wireless communications network. The first base station is capable of determining a phase offset between, at least, the first base station and a second base station. The method also includes receiving the synchronization data from the second base station. The second base station is capable of determining the phase offset between, at least, the second base station and the first base station. Additionally, the method includes algorithmically determining that the first base station has a synchronization failure. The determining includes analyzing the synchronization data received from the first base station and the second base station, comparing the synchronization data to the corresponding control data for each of the received synchronization data to determine whether a difference between the synchronization data and the control data exceeds a predetermined threshold, and determining that the difference for at least one of the synchronization data associated with the first base station exceeds the predetermined threshold. The method further includes initiating an action to indicate that the first base station has the synchronization failure.

In a fourth aspect of the present invention, a method for listening to a neighboring base station is provided. The method includes, at a first base station, transmitting one or more signals over a first frequency designated for transmission. One or more signals transmitted over the first frequency are identified to obtain a phase and an amplitude of each of the one or more signals. The method further includes generating an in-phase inverse amplitude in real time. And, at the first base station, the in-phase inverse amplitude in applied to cancel out the one or more signals.

In a fifth aspect, a system for enabling a base station to listen to a neighboring base station is provided. The system includes a base station and an antenna. The base station includes a cancellation component. The cancellation component includes an identification component that identifies one or more signals transmitted over a first frequency to obtain a phase and an amplitude of each of the one or more signals. A generation component that generates, in real time, an in-phase inverse amplitude based on the one or more signals is also included in the system as part of the cancellation component. The cancellation component further includes an application component that applies, at the first base station, the in-phase inverse amplitude to cancel out the one or more signals.

In a sixth aspect of the present invention, computer-readable media having computer-executable instructions embodied thereon are provided that, when executed, perform a method for listening to one or more neighboring base stations. The method includes, at a first base station, transmitting one or more signals over a first frequency designated for transmission to one or more user equipment and/or mobile devices in an FDD telecommunications network. The first base station is capable of monitoring the one or more signals transmitted over the first frequency to obtain a phase and an amplitude of each of the one or more signals. The method further includes generating, in real time, an in-phase inverse amplitude based on the one or more signals. Cancelling out the one or more signals as received at the first base station is achieved by applying, at the first base station, the in-phase inverse amplitude to the one or more signals such that the first base station listens to the one or more neighboring stations over the first frequency. Additionally, the method includes, at the first base station, receiving a synchronization signal from the one or more neighboring base stations over the first frequency.

Initially referring to FIG. 1, FIG. 1 depicts an illustrative operating environment, referenced generally by the numeral 100. The illustrative operating environment 100 enables detection of a synchronization failure of a base station in a wireless communications network. The illustrative operating environment 100 shown in FIG. 1 is merely an example of one suitable operating environment and is not intended to suggest any limitation as to the scope of use or functionality of embodiments of the present invention. For instance, the network illustrated in the illustrative operating environment 100 may operate using a particular technology, such as GSM, CDMA, WAN, WiFi, WiMAX, LTE, LTE Advanced, EVDO, HRPD, eHRPD, and the like. These technologies are listed for exemplary purposes only, and are not meant to limit the scope of the present invention. In one embodiment, the networking environment of FIG. 1 operates using LTE technology, but may also operate using other technologies as well, as will be further described herein. Additionally, the illustrative operating environment 100 may comprise one or more of the components illustrated in FIG. 1, but in one embodiment, the illustrative operating environment 100 includes a cell tower, a BTS, an RNC, gateways, etc. Not all components that make up a wireless communications network are shown.

The illustrative operating environment 100 of FIG. 1 is shown having user equipment and/or a mobile device 110 that is in communication with the network. The mobile device 110 may be in communication with a cell tower 114 via a wireless-telecommunications link such as, for example, wireless-telecommunications link 112. Wireless-telecommunications link 112 enables data to be wirelessly communicated between the mobile device 110 and the cell tower 114. This allows the mobile device 110 to access the Internet by way of, for example, the wireless communications network 124.

The cell tower 114 includes, among other components not shown, a base station 118. In one embodiment, where LTE technology is employed, the base station 118 is termed an eNodeB. However, at least in FIG. 1, it will be referred to as a base station 118. The base station 118 may be a large-coverage access component, in one embodiment. A large-coverage access component, compared to a small-coverage access component, is able to communicate data over longer distance and is typically associated with a cell tower, such as cell tower 114, while a small-coverage access component is only able to communicate over short distances. Examples of small-coverage access components include femto cells and pico cells. The cell tower 114 is in communication with the wireless communications network 124 by way of wireless-telecommunications link 122. As used herein, the cell tower 114 and the base station 118 refer to the equipment that facilitate wireless communication between user equipment, such as mobile device 110 and/or user equipment, and the wireless communications network 124.

As mentioned, embodiments provided herein enable detection of a base station that has a synchronization failure. Synchronization, as used herein, generally refers to a technique applied to ensure that all access components (e.g., base stations) in a wireless communications network are operating within performance parameters defined by the appropriate standard, such as 3GPP or the like. Synchronization is achieved by delivering a specifically formatted clock signal to a base station's radio. A synchronization failure, if not quickly addressed, can be destabilizing to a wireless communications network and may result in dropped calls, failed service and/or incorrect data being transmitted to a mobile device and/or user equipment. As such, synchronization is essential in a wireless communications network.

GPS signals, TDM circuits, and SyncE are some exemplary ways for base stations to stay in sync with the other base stations in the network. In the exemplary operating environment 100 of FIG. 1, the cell tower 114 includes an antenna 116 that may have the capability of providing various transmitting and receiving functions. In one embodiment, the antenna 116 is capable of receiving GPS signals for the purpose of, for example, providing synchronization to the base station 118. However, in the event of a loss of a stable synchronization source, such as GPS utilizing antenna 116, an oscillator 120 can be used for holdover until the GPS signal issue is resolved. An exemplary oscillator implemented in an embodiment herein is a crystal oscillator. Generally, a crystal oscillator (e.g., quartz crystal, polycrystalline ceramics) is an electronic oscillator circuit that uses mechanical resonance of a vibrating crystal to create an electrical signal with a precise frequency. This frequency may be used to provide a stable clock signal. However, with other implementations, other oscillators may also be employed depending on the stability or hold-over required. Such oscillators could include a rubidium oscillator, cesium oscillator, or hydrogen maser oscillator.

Oscillators have different holdover capacities, and thus estimating the holdover capacity of a particular oscillator can be difficult. The base station 118 may be able to estimate a shorter duration of oscillator holdover in the event of the loss of the stable synchronization source, such as GPS, and prematurely turn itself off, but this may result in an unnecessary loss of coverage. Alternatively, the base station 118 could determine a longer estimation, thereby turning itself off only after the loss of required synchronization accuracy causes a disturbance in all neighboring base stations. However, in this case, other base stations could become affected by base station's 118 loss of synchronization, and this may affect many customers. As such, embodiments provided herein enable detection of a synchronization failure in a base station prior to other base stations being affected. Further embodiments provided herein enable a base station to, in effect, cancel out its own transmission signal(s), which overloads the base station's antenna due to proximity, in order to listen and receive signals from other, neighboring base stations.

Figure 8:
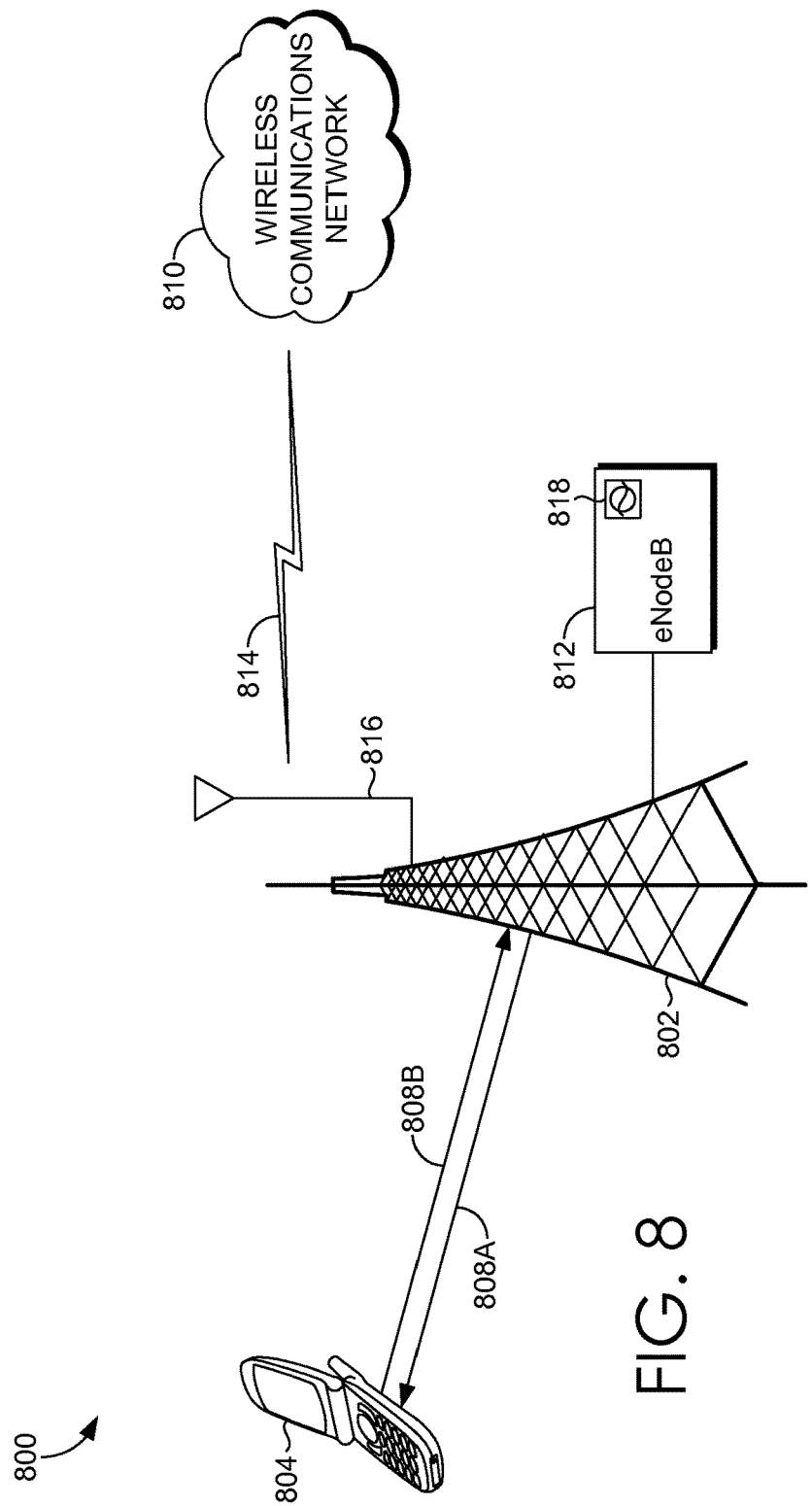
FIG. 8 depicts another exemplary networking environment for carrying out embodiments of the present invention.

Turning to FIG. 8, it depicts an illustrative operating environment 800 similar to FIG. 1, referenced generally by the numeral 800. The illustrative operating environment 800 enables detection of a synchronization failure of a base station 802 in a wireless communications network by, in effect, cancelling out the transmission signal(s) of a base station 802 such that the base station 802 may listen and receive signals from neighboring base stations. The illustrative operating environment 800 shown in FIG. 8 is merely an example of one suitable operating environment and is not intended to suggest any limitation as to the scope of use or functionality of embodiments of the present invention. For instance, the network illustrated in the illustrative operating environment 800 may operate using a particular technology, such as, LTE, LTE Advanced, and the like. In one embodiment, the networking environment 800 of FIG. 8 operates using LTE technology, such as Frequency Division Duplexing (FDD), but may also operate using other technologies as well. Additionally, the illustrative operating environment 800 may comprise one or more of the components illustrated in FIG. 8, but in one embodiment, the illustrative operating environment 800 includes a cell tower, a BTS, an RNC, gateways, etc. Not all components that make up a wireless communications network are shown.

The illustrative operating environment 800 of FIG. 8 is shown having user equipment such as a mobile device 804, for example, that is in communication with the wireless communications network 810. The mobile device 804 may be in communication with a base station 802 or cell tower via wireless-telecommunications links such as, for example, wireless-telecommunications links 808A and 808B. Wireless-telecommunication links 808A and 808B may be a downlink band (e.g., Forward Link) and an uplink band (e.g., Reverse Link), respectively, in further embodiments. In some embodiments, a downlink band is generally a frequency or range of frequencies that describe the transmission path from the base station 802 to the mobile user device 804 (e.g., cellular phone), such as wireless-telecommunications link 808A, in a cellular network such as CDMA or GSM employing LTE or LTE Advanced standards using FDD, for example. In an FDD context, an uplink band is generally a frequency or range of frequencies that describe the transmission path from the mobile user device 804 to the base station 802, such as wireless-telecommunications link 808B, for example. In other embodiments, wireless-telecommunication links 808A and 808B may be a forward link and a reverse link, respectively, in the context of a cellular network such as CDMA or DSM employing LTE or LTE Advanced standards. In some cellular contexts, a forward link generally describes a transmission from a fixed location such as the base station 802 to a mobile user device 804 (e.g., wireless-telecommunications link 808A), while a reverse link generally describes a transmission from a mobile user device 804 to a fixed location such as the base station 802 (e.g., wireless-telecommunications link 808B). In a cellular network such as CDMA or GSM employing LTE or LTE Advanced standards using FDD, wireless-telecommunication links 808A and 808B may be an uplink frame and a downlink frame, or an uplink pilot time slot and a downlink pilot time slot, respectively. Wireless-telecommunications links 808A and 808B enable data to be wirelessly communicated between the mobile device 804 and the base station 802. This allows the mobile device 804 to access the Internet by way of, for example, the wireless communications network 810.

The base station 802 comprises, among other components not shown, an evolved Node B 812 (eNodeB), in embodiments employing LTE technology. In embodiments, the base station 802 may be a large-coverage access component, as previously described with respect to exemplary FIG. 1. Generally, the base station 802 is in communication with the wireless communications network 810 by way of other wireless-telecommunications links 814. As used herein, the base station 802 and eNodeB 812 refer to the equipment that facilitate wireless communication between user equipment, such as mobile device 804, and the wireless communications network 810.

As mentioned, embodiments provided herein enable the base station 802 to, in effect, cancel out its own transmission signal(s), which overloads the base station's 802 own antenna 816 due to proximity, such that the base station may listen and receive signals from neighboring base stations (not shown). In some embodiments, the base station 802 receives synchronization signals (e.g., wireless-telecommunication link 808A) from one or more neighboring base stations in the wireless communications network 810. By receiving a signal from a neighboring base station, for example, the base station 802 may utilize the signal to determine if the base station 802 and/or the neighboring base station has experienced a synchronization failure. In further embodiments, the base station 802 may transmit or relay the received signal to a server, wherein the server may utilize the signal to determine if the base station 802 and/or the neighboring base station has experienced a synchronization failure. And oscillator 818, previously described above, may be employed by the base station 802 in the event of a synchronization failure.

Generally, in an LTE-FDD environment, a signal (e.g., synchronization signal) is transmitted from the base station 802 to the mobile user device 804 over a downlink band (e.g., wireless-telecommunications link 808A) designated for that particular transmission path. Because the base station 802 broadcasts over the downlink band, the base station 802 generally cannot receive signals over the downlink band because the base station's 802 own transmitted signal overloads the antenna 816 over the downlink band due to the strength and proximity of the base station's 802 own transmitted signal over the downlink band via the antenna 816. Instead, the base station 802 receives signals from a mobile user device 804 transmitted to the base station 802 over an uplink band (e.g., wireless-telecommunications link 808B). Because the uplink band receives signals at a frequency or range of frequencies that are different than the frequency or range of frequencies of the downlink band, the base station 802 can receive signals via the uplink band while concurrently and/or simultaneously transmitting signals over the downlink band. Accordingly, two-way signal traffic or signal transmission is enabled in an LTE-FDD environment, for example. Neighboring base stations perform similarly by transmitting signals to one or more mobile user devices over the same or similar downlink band and receiving signals from one or more mobile user devices over the same or similar uplink band. Accordingly, the base station 802 may not receive signals from other, neighboring base stations because each of the neighboring base stations are transmitting over the same or similar downlink band and receiving over the same or similar uplink band as the base station 802. Importantly, the employment of the same or similar downlink and uplink bands of nearby or neighboring base stations is essential to prevent, reduce, and/or avoid interference between each of the base station 802 and any nearby or neighboring base stations.

However, as described with regard to FIG. 8, the base station 802 may not know if it is properly synchronized in the event of a loss of a stable synchronization source, such as GPS utilizing antenna (e.g., antenna 816). While the base station 802 relies generally on the oscillator (e.g., oscillator 818) to provide a stable clock signal, the present invention enables the base station 802 to listen to neighboring base stations for synchronization signals and/or information. In order to listen or hear neighboring base stations, the base station 802 receives a signal over the downlink band over which the neighboring base stations are broadcasting to one or more mobile user devices. Further, the base station 802 is itself concurrently broadcasting to the mobile user device 804 over the same or similar downlink band. As such, the base station 802 must, in effect, cancel out the downlink band, which is overloaded by the base station's 802 own downlink signal.

Figure 9:
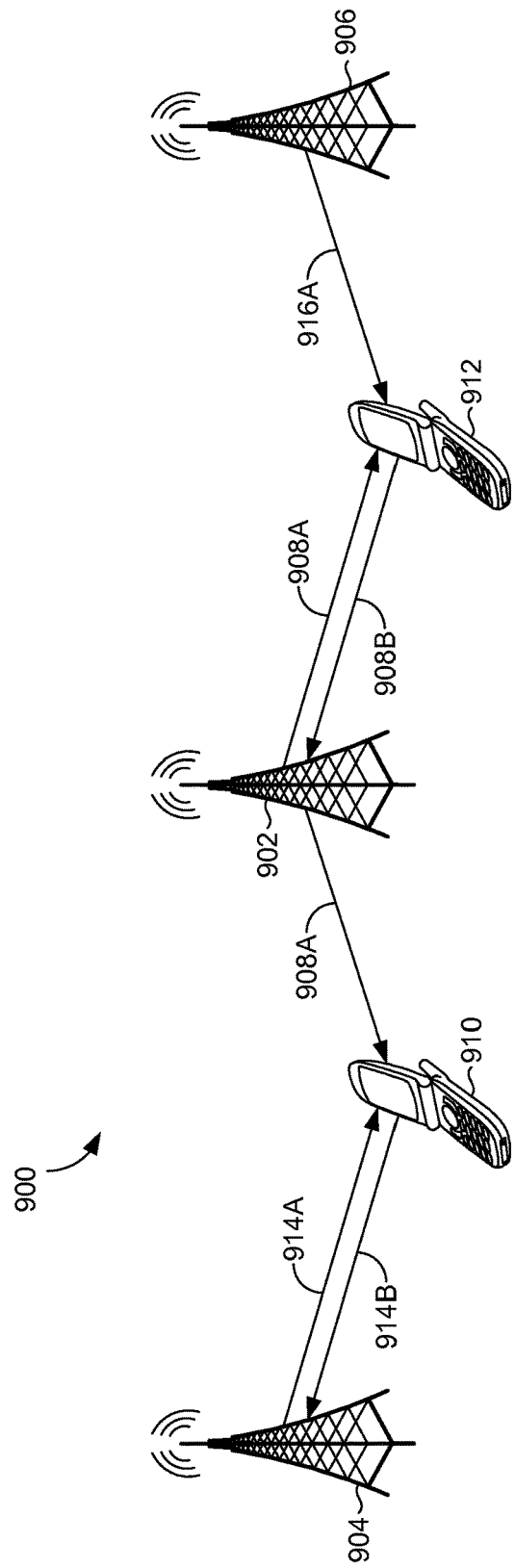
FIG. 9 illustrates an exemplary networking environment for carrying out an embodiment of the present invention.

Continuing to FIG. 9, it illustrates an exemplary networking environment 900 carrying out embodiments of the present invention. FIG. 9 presents a simplified diagram and is not meant to represent any scale, particular distance or proximity, or network carrier specifically, and as such, the present invention should not be limited in such a fashion. In FIG. 9, the exemplary primary base station 902 is located near one or more neighboring base stations 904 and 906. In some embodiments, the primary base station 902 may be named as a first base station, or a reference base station. The use of the word primary, first, and/or reference is not meant to imbue the base station 902 with any particular qualities, characteristics, and/or limitations, but rather, to promote clarity of the description set forth herein. It will be understood to one having ordinary skill in the art that any of the primary base station 902 and neighboring base stations 904 and 906 depicted in exemplary FIG. 9 may be capable of performing the functions described herein and, additionally, may have the same or similar relationships to one another and other components depicted.

The primary base station 902 transmits one or more wireless signals 908A over a first frequency. In some embodiments, the first frequency is a frequency or a range of frequencies corresponding to, or designated as, a downlink band or forward link transmission path, for example, in an LTE-FDD environment. And, as transmitted, the signals 908A follow a transmission path from the primary base station 902 to one or more mobile user devices 910 and 912.

For example, the first frequency might be a range of frequencies, in an LTE-FDD environment, that are associated with broadcasting to mobile user devices. Additionally, the primary base station 902 may receive one or more signals from mobile user devices 912, for example, over a second frequency. In embodiments, the second frequency is different from the first frequency. In some embodiments, the second frequency is a frequency or range of frequencies corresponding to, or designated as, an uplink or reverse link transmission path, for example, in an LTE-FDD environment. In further embodiments, the second frequency does not overlap with the first frequency. As received, the signals 908B follow a transmission path from one or more of the mobile user devices 910 and 912 to the primary base station 902, in some embodiments. FIG. 9 further illustrates that each of the primary base station 902 and neighboring base stations 904 and 906 may communicate with each of the mobile user devices 910 and 912. For example, neighboring base station 906 may transmit a signal 916A to mobile user device 912. In another example, neighboring base station 904 may transmit a signal 914A over a first frequency or downlink band to mobile user device 910 while concurrently and/or simultaneously receiving a signal 914B from the mobile user device 910 over a second frequency or uplink band. And depending on location, proximity, and/or network carrier, for example, the mobile user device 912 may concurrently and/or simultaneously receive a signal from the primary base station 902 and/or each of the neighboring base stations 904 and 906, in further embodiments.

The primary base station 902 may identify one or more signals 908A, as transmitted over the first frequency or a downlink band via an antenna, for example. In one example, the primary base station 902 identifies each of the one or more signals 908A individually. Alternatively, in another example, the primary base station 902 identifies all the signals or an aggregated signal (e.g., total signal output or total signal traffic) that accounts for all of the one or more signals 908A. Upon identifying the signals 908A, the primary base station 902 may obtain a phase, an amplitude, or a combination thereof, of the signals 908A. Amplitude may be defined as one half the full extent of a wave (e.g., the power of a signal). Herein, we describe an amplitude to refer to the power of a signal. With respect to signals, phase describes a location or point of reference within a wave that describes a signal. When one signal is in-phase with another signal, the signals do not have a phase difference, wherein phase difference may be expressed in degrees, radians, or time, as will be known to those having skill in the art. For the purposes of simplicity herein, we refer to a phase and an amplitude to describe available phase information and amplitude information for one or more signals. A phase, an amplitude, or a combination thereof may correspond to, or be a characteristic of, one of the signals 908A identified, in embodiments. In some embodiments, the primary base station 902 may identify the signals 908A transmitted over the first frequency in order to obtain a phase and/or an amplitude of each of the one or more signals 908A. Alternatively and/or additionally, the primary base station 902 may identify the signals 908A transmitted over the first frequency in order to obtain a phase and/or an amplitude of the sum of all the one or more signals 908A. And, the primary base station 902 may identify the signals 908A transmitted over the first frequency in order to obtain a phase and/or an amplitude of the one or more signals 908A. Accordingly, the primary base station 902 may identify, monitor, and/or measure each of the one or more signals 908A transmitted by the primary base station 902. In further embodiments, the primary base station 902 may continuously, periodically, intermittently, and/or in response to an indication, identify the signals 908A, together or individually, transmitted over the first frequency in order to obtain a phase and/or an amplitude of said signals 908A. Further, the primary base station 902 identifies the signals 908A, either together or individually, and obtains a phase and/or an amplitude of the signals 908A, either together or individually, in real time or near real time. As such, the identification of the signals 908A may be executed and/or preformed in real time such that a phase and an amplitude are obtained at each instance in time to reflect the transmission of the signals 908A in real time.

The primary base station 902 may generate an in-phase inverse amplitude. The primary base station 902 may determine and generate an in-phase inverse amplitude based on each of the one or more signals 908A transmitted over the first frequency by the primary base station 902, in some embodiments. Additionally and/or alternatively, in some embodiments, the primary base station 902 may generate an in-phase inverse amplitude based on all of the one or more signals and/or the aggregate of the signals 908A transmitted over the first frequency. In various embodiments, the primary base station 902 generates an in-phase inverse amplitude in real time based on the transmission of the signals 908A in real time. As such, the in-phase inverse amplitude may be generated in real time or near real time, and in response to the transmission of the signals 908A, for example.

The primary base station 902 may use, input, and/or otherwise apply an in-phase inverse amplitude to itself, in embodiments. By applying the in-phase inverse amplitude at the primary base station 902, the overload of the antenna on the first frequency and/or downlink band is, in effect, cancelled out, in various embodiments. The application of the in-phase inverse amplitude occurs in real time with respect to the transmission of the signals 908A over the first frequency, in embodiments. By cancelling out the transmitted signals 908A which cause overload of the antenna of the primary base station 902 with respect to the first frequency, the primary base station 902 may listen for signals 914A and 916A from neighboring base stations 904 and 906 over the first frequency. As such, application and/or input, at the primary base station 902, of an in-phase inverse amplitude that acts to cancel out the one or more signals 908A enables the primary base station 902 to listen for a second signal (e.g., signals 914A and/or 916A) from the neighboring base stations 904 and 906 over the first frequency that is generally designated for transmissions from fixed locations, such as base stations to mobile user devices 910 and 912. The cancellation of the overload effect created by the transmission of the signals 908A may be internal such that an in-phase inverse amplitude is internally input to the primary base station 902, for example. In such an example, the cancellation acts to negate receipt of the signals 908A transmitted by the primary base station 902, as picked up by the primary base station's 902 antenna. The cancellation enables the primary base station 902 to listen for signals, other than its own transmitted signals 908A, over the first frequency. As such, the primary base station 902 may listen for and/or hear one or more signals 914A and 916A from neighboring base stations 904 and 906 over the first frequency. For example, the primary base station 902 may listen for and/or hear a synchronization signal of another base station, such as base station 904 for example, over the first frequency. In yet further embodiments, the primary base station 902 may receive, over the first frequency or downlink band, a second signal (e.g., signal 914A and/or signal 916A) transmitted from one or more neighboring base stations 904 and 906. Upon receiving the second signal from neighboring base stations 904 and 906, the primary base station 902 may utilize the second signal to determine if the primary base station 902 and/or the neighboring base station(s) 904 and 906 that sent the second signal are properly synchronized. Alternatively, upon receiving a second signal from neighboring base stations 904 and 906, the primary base station 902 may transmit or relay the second signal and other information to a server, wherein the server may determine and/or detect a synchronization failure of the primary base station 902 and/or the neighboring base stations 904 and 906, as described with respect to FIGS. 2-7, for example. In some embodiments, the primary base station 902 and neighboring base stations 904 and 906 employ LTE-FDD techniques. In further embodiments, the primary base station 902 and neighboring base stations 904 and 906 might belong to the same or similar network carrier within a telecommunications network.

Figure 10:
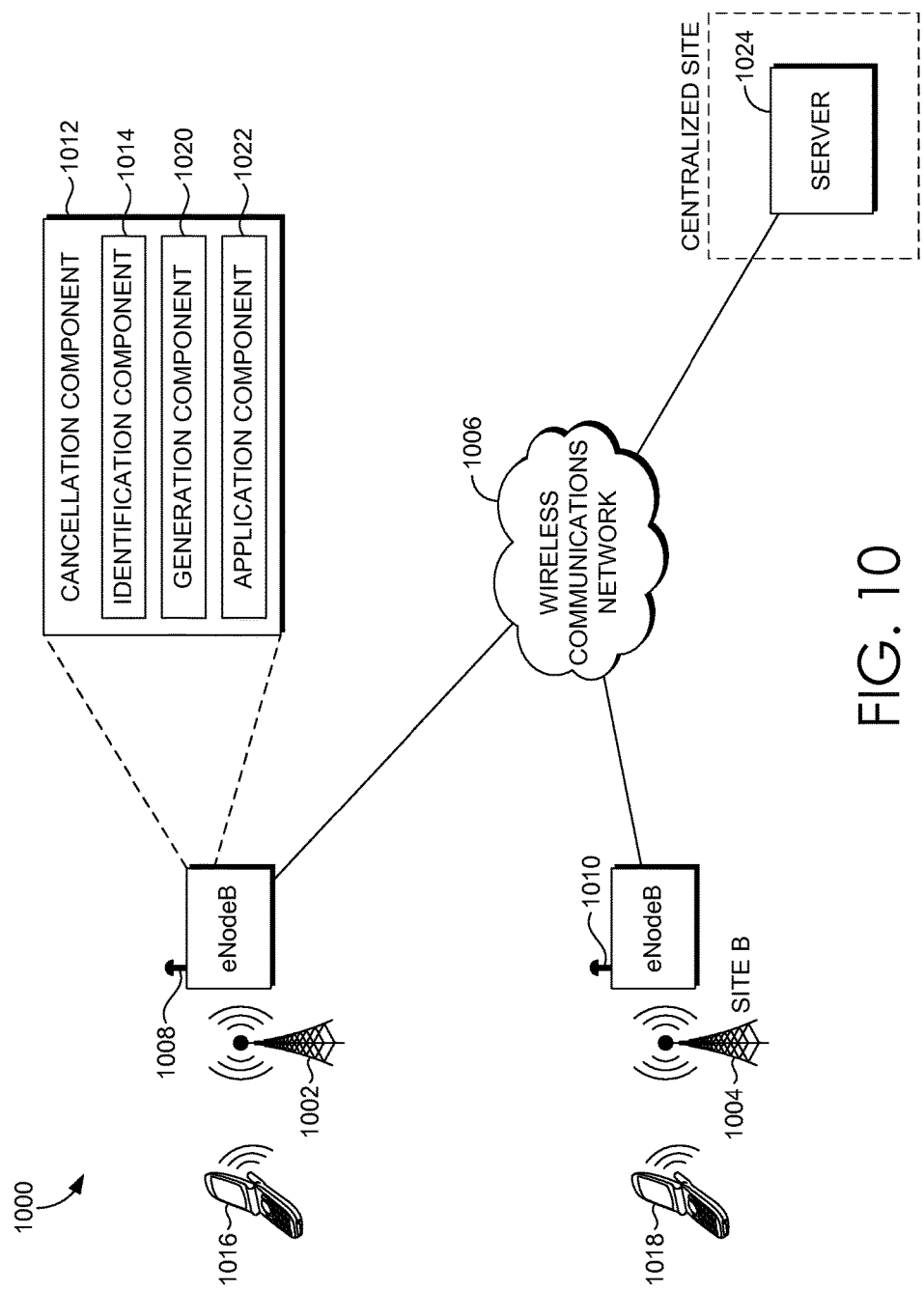
FIG. 10 depicts another exemplary networking environment for carrying out an embodiment of the present invention.

Turning to FIG. 10 an exemplary system 1000 for enabling a base station 1002 to listen to a neighboring base station 1004 is provided. In various embodiments, the one or more base stations 1002 and 1004 are each an eNodeB operating in a wireless communications network 1006, such as an LTE-FDD telecommunications network. Each of the base stations 1002 and 1004 have an antenna 1008 and 1010 and a cancellation component 1012 (only a single cancellation component is depicted for simplicity). The cancellation component 1012 includes an identification component 1014. The identification component 1014 identifies one or more signals transmitted over a first frequency to obtain a phase and/or an amplitude of each of the one or more signals, for example. The one or more signals are transmitted over the first frequency, which is designated for broadcast to one or more mobile user devices 1016 and 1018, in embodiments. In further embodiments, the identification component 1014 may identify a phase and/or an amplitude that represents all of the one or more signals (e.g., total signal output or total signal traffic), or an aggregate of all the signals transmitted over a first frequency, by the exemplary base station 1002. Alternatively, the identification component 1014 may identify may identify a phase and/or an amplitude that for each individual signal. For example, the identification component 1014 may obtain a composite amplitude that represents the total signal traffic including all of the signals transmitted over the first frequency by the base station 1002. As previously discussed, the first frequency may be a downlink band or a forward link, in some embodiments.

The cancellation component 1012 includes a generation component 1020. The generation component 1020 determines and/or generates, in real time or near real time, an in-phase inverse amplitude based on the one or more signals transmitted over the first frequency. In some embodiments, the generation component 1020 generates an in-phase inverse amplitude based on a total-traffic (e.g., aggregated and/or composite) amplitude, as obtained by the identification component 1014. The generation component 1020 determines and/or generates an in-phase inverse amplitude or input that, in effect, cancels the self-detection of the one or more signals at the base station 1002 that is transmitting or has transmitted the signals. Accordingly, the cancellation component 1012 includes an application component 1022 that applies, at the base station 1002, the in-phase inverse amplitude to cancel out the one or more signals. The cancellation of the signals, internally, at the base station 1002, allows the base station 1002 to listen for signals from the neighboring base station 1004 over the first frequency.

As such, the base station 1002 can receive signals from the neighboring base station via the first frequency. In further embodiments, the neighboring base station 1004, having a cancellation component therein, may perform similar functions to listen for and/or receive signals from the base station 1002 over the first frequency. Upon the base station 1002 receiving a signal from the neighboring base station 1004, or vice versa, for example, the base station 1002 may transmit the received signals and/or other synchronization information to a server 1024. Such a server 1024, at a centralized site, might further determine if the base stations 1002 and 1004 have experienced a synchronization failure, for example.

Figure 11:
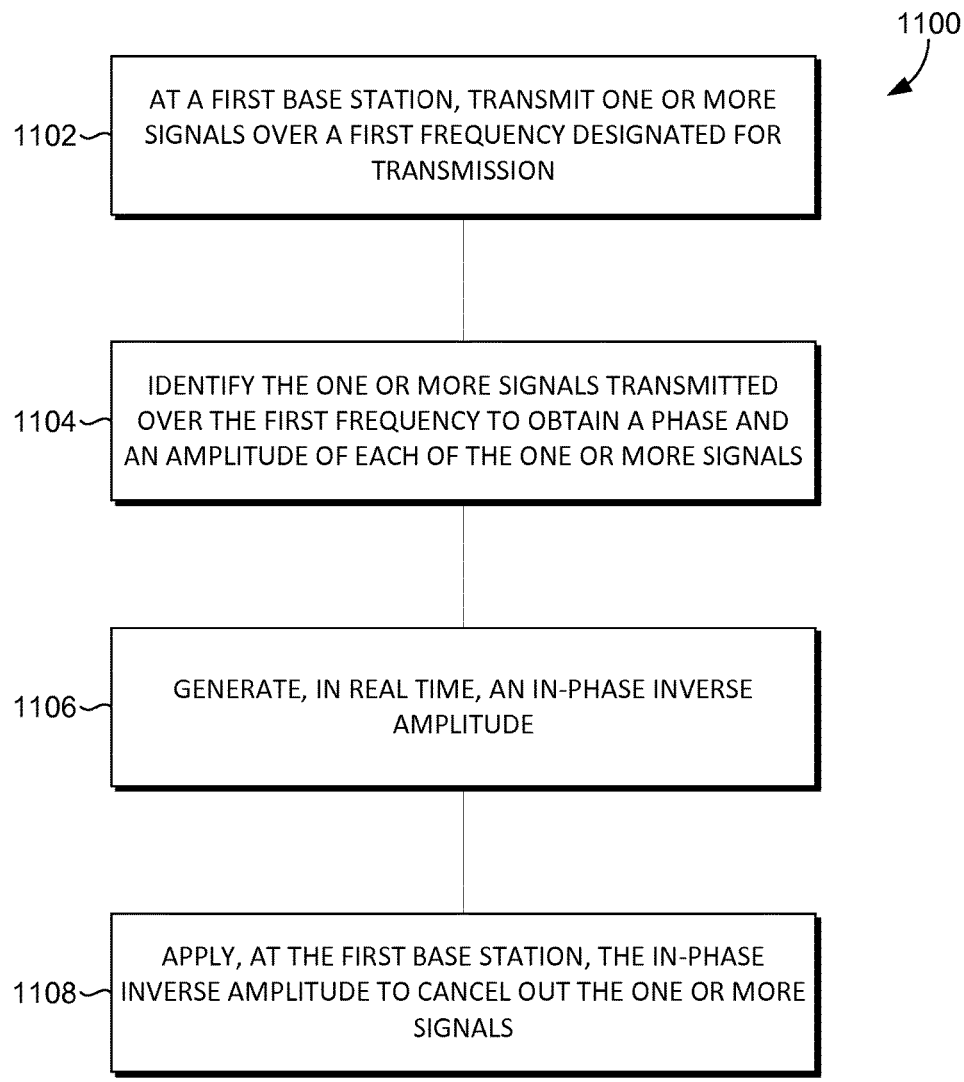
FIG. 11 depicts a flow chart of a method for listening to a neighboring base station, in accordance with an embodiment of the present invention.

At FIG. 11, a method 1100 for listening to a neighboring base station is depicted, in accordance with an embodiment of the present invention. At block 1102, the method 1100 includes transmitting, at a first base station, one or more signals over a first frequency designated for transmission. The signals may be transmitted by the first base station via an antenna, for example. The one or more signals transmitted over the first frequency may be identified in order to obtain a phase and an amplitude of each of the one or more signals, in the method 1100, shown at block 1104. In some embodiments, identifying transmitted signals and obtaining a phase and an amplitude corresponding to said transmitted signals may be preformed in real time or near real time with transmission of said signals. Additionally and/or alternatively, identifying the signals transmitted over the first frequency designated for transmission and/or obtaining a phase and an amplitude corresponding to the signals, individually and/or together, may be performed continuously, periodically, intermittently, or in response to an indication to do so. Identification of signals and/or obtaining a phase and an amplitude thereof may be performed by the first base station. As such, the first base station and/or an identification component therein may monitor its own signal transmissions over the first frequency, in further embodiments. The method 1100, at block 1106, further includes generating, in real time, an in-phase inverse amplitude. The in-phase inverse amplitude will be in-phase with the transmitted signals and will have an amplitude that is the inverse of the transmitted signals. The first base station and/or a generation component therein may determine and/or generate the in-phase inverse amplitude. Finally, at the first base station, the in-phase inverse amplitude is applied to cancel out the one or more signals, at block 1108. The application of the in-phase inverse amplitude, at the first base station, acts to cancel out the one or more signals as picked up by the first station. For example, the in-phase inverse amplitude, when applied, operates to internally cancel the receipt of the one or more signals transmitted over the first frequency, or downlink frequency, at the first base station. The application of the in-phase inverse amplitude may be performed by an application component at the first base station, for example. The cancellation enables the first base station to listen for a second signal from a neighboring base station over the first frequency that is generally designated for transmission to mobile user devices. As such, in further embodiments, the method includes listening, at the first base station and over the first frequency, for a second signal from one or more neighboring base stations. In embodiments, the first base station listens over the first frequency while concurrently and/or simultaneously receiving signals over a second frequency that is generally designated for transmission from mobile user devices to base stations. In yet further embodiments, the method includes receiving, at the first base station and over the first frequency designated for transmission, a second signal transmitted from a nearby or neighboring base station.

By creating an in-phase inverse amplitude that may be applied or input to cancel the transmitted signals of a base station over a first frequency, the base station may listen for and receive a signal, such as a synchronization signal, from another base station over the first frequency. The neighboring base station's signals, received over the first frequency or downlink frequency, may be utilized by the base station and/or a server to detect a synchronization failure of the base station and/or other, neighboring base stations. As such, upon listening for and receiving a signal from one or more neighboring base stations over the first frequency, a base station may transmit or relay the received signal(s) and other information to a server. In embodiments, the server may determine or detect a synchronization failure of the base station and/or the neighboring base stations, as described with respect to FIGS. 2-7, for example.

Figure 12:
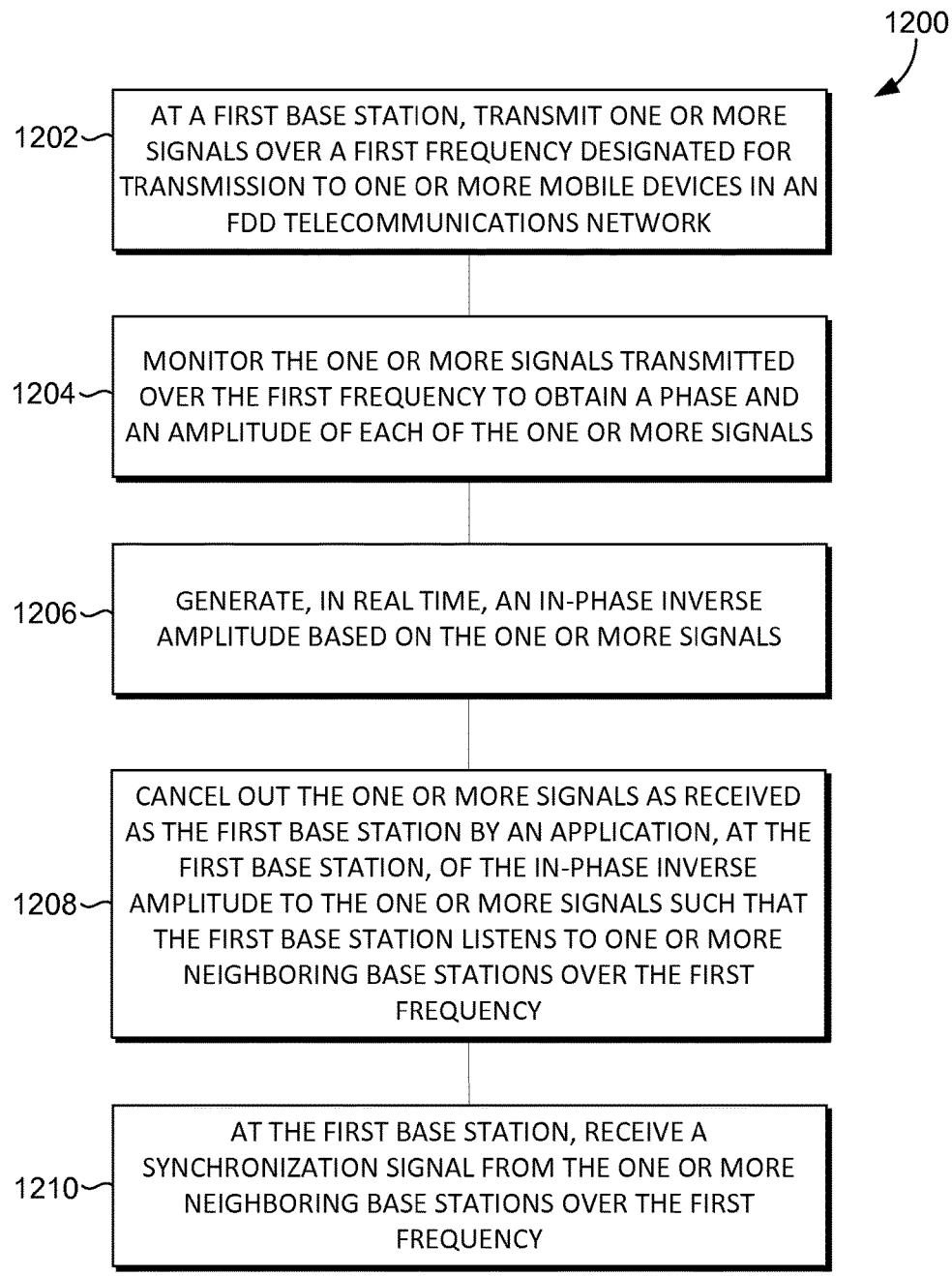
FIG. 12 depicts a flow chart of another exemplary method for listening to a neighboring base station, in accordance with an embodiment of the present invention.

Turning now to FIG. 12, it depicts a method 1200 for listening to one or more neighboring base stations, which may be performed by computer-executable instructions embodied on computer-readable media. The method 1200 includes transmitting, at a first base station, one or more signals over a first frequency designated for transmission to user equipment such as one or more mobile devices in an FDD telecommunications network, at block 1202. The method 1200 also includes monitoring the one or more signals transmitted over the first frequency to obtain a phase and an amplitude of each of the one or more signals, shown at block 1204. Additionally, at block 1206, an in-phase inverse amplitude is generated, in real time or near real time, based on the one or more signals. The method 1200 further includes cancelling out the one or more signals as received at the first base station by applying, at the first base station, the in-phase inverse amplitude to the one or more signals such that the first base station listens to the one or more neighboring base stations over the first frequency, depicted at block 1208. As such, at block 1210, at the first base station, a synchronization signal from the one or more neighboring base stations may be received over the first frequency.

Figure 13:
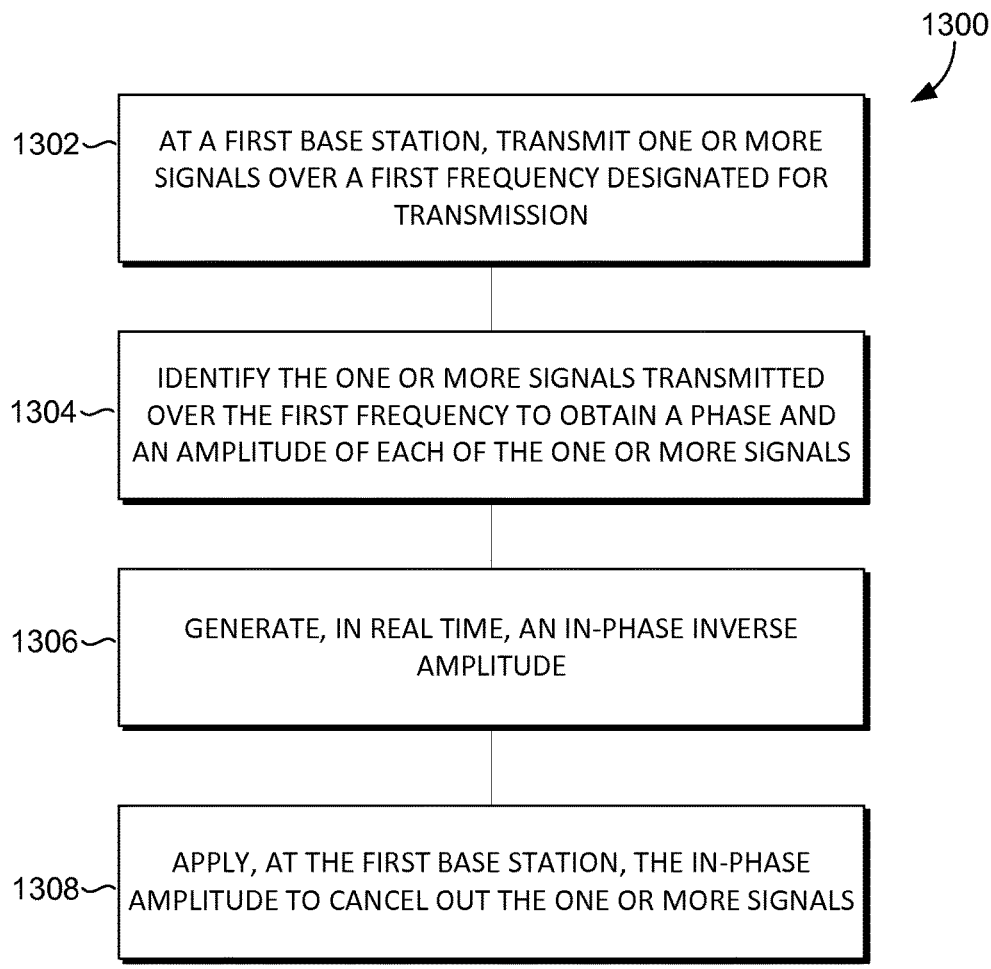
FIG. 13 depicts a flow chart of yet another exemplary method for listening to a neighboring base station, in accordance with an embodiment of the present invention.

At FIG. 13, a method 1300 for listening to a neighboring base station is provided, as well. The method 1300 includes, at block 1302, transmitting, at a first base station, one or more signals over a first frequency designated for transmission and identifying, at block 1304, the one or more signals transmitted over the first frequency to obtain a phase and an amplitude of each of the one or more signals. Further, the method 1300 includes generating, in real time, an in-phase inverse amplitude, shown at block 1306. The in-phase inverse amplitude is applied at the first base station to cancel out the one or more signals, thereby enabling the base station to listen for a neighboring base station, depicted at block 1308.

Figure 2:
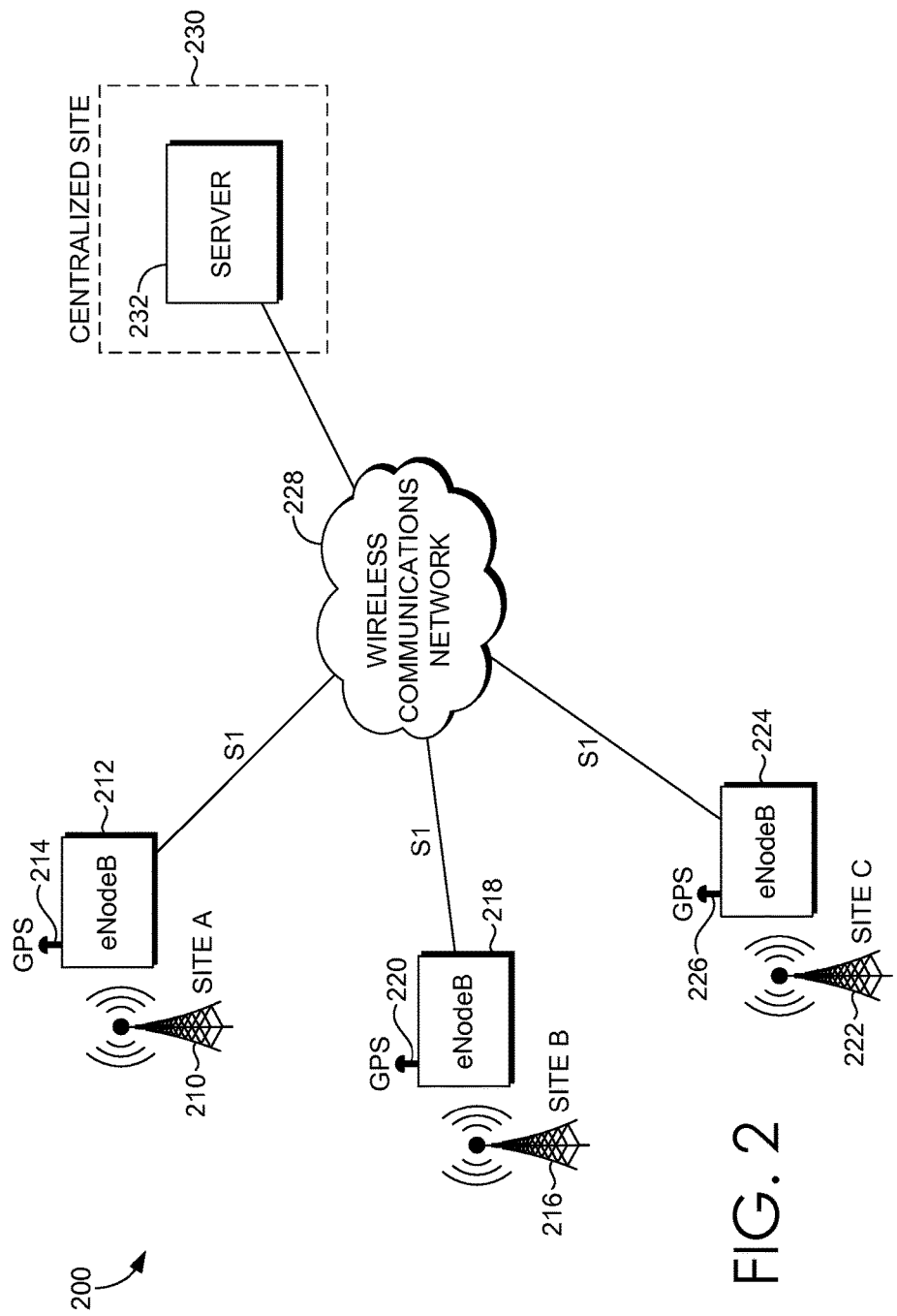
FIG. 2 depicts another exemplary networking environment for carrying out embodiments of the present invention.

FIG. 2 depicts an exemplary networking environment for carrying out embodiments of the present invention. The networking environment of FIG. 2 is referenced generally using numeral 200. The wireless communications network 228 is in communication with several eNodeBs (items 212, 218, 224), some of which are not illustrated in FIG. 2. Three eNodeBs are illustrated in the embodiment of FIG. 2, but it is contemplated that more or less than three eNodeBs may be included in a particular wireless communications network. The technology utilized in the embodiment of FIG. 2 is LTE, and therefore the base stations are termed eNodeBs. As described with reference to FIG. 1, each eNodeB may be associated with an antenna that is used at least for receiving GPS signals, and a cell tower, in addition to other components and equipment not illustrated in FIG. 2. For example, eNodeB 212 is associated with antenna 214 and cell tower 210, collectively referred to herein as site A. eNodeB 218 is associated with antenna 220 and cell tower 216, collectively referred to herein as site B. eNodeB 224 is associated with antenna 226 and cell tower 222, collectively referred to herein as site C. As shown, an Si interface may be used to communicate data back and forth between the eNodeBs and the wireless communications network 228.

Also shown in FIG. 2 is a centralized site 230 having a server 232. The server 232 utilized in embodiments described herein may be a new server that would not have been used prior to the embodiments described herein, or the server 232 may be an existing server that is provided with additional logic so that it can perform embodiments described herein. The location of the server 232 is not crucial, as long as the server 232 can receive data from the eNodeBs through the wireless communications network 228.

Utilizing embodiments described herein, the server 232 performs an algorithm that is used to detect that a base station, such as an eNodeB, has synchronization failure. As soon as this is detected, a flag can be set or an alarm can be sounded that indicates that an action should be taken with respect to that base station having the synchronization failure. Instead of each eNodeB in FIG. 2 being isolated in terms of synchronization, in one embodiment, each of the eNodeBs illustrated in FIG. 2 is capable of listening to neighboring eNodeBs and measuring their relative frequency and phase offset via LTE. For example, eNodeB 212 may be capable of measuring the frequency of eNodeB 218, eNodeB 224, and others that are not shown in FIG. 2. In embodiments, one eNodeB may not be able to listen or capture signal data from another eNodeB based on the distance between them. For example, site A (eNodeB 212) may be far enough away from another eNodeB in distance that site A cannot capture signal data from the other site, and vice versa. As such, site A may only capture signal data from sites B, C, and any others that are close enough in distance. Each eNodeB is programmed to be able to compute a phase offset of phase shift between two eNodeBs. As such, site A may provide to the server 232 a phase offset for each of site A to site B and site A to site C. Site B may provide to the server 232 a phase offset for each of site B to site A and site B to site C. Site C may provide to the server 232 a phase offset for each of site C to site A and site C to site B. As mentioned, any of the sites illustrated in FIG. 2 may not be able to capture synchronization data (e.g., frequency data, phase data) from another site based on the distance between the sites.

In one embodiment, the server 232 is programmed to periodically collect the synchronization data from the eNodeBs in the network. The collection of data may occur at predetermined increments of time. This predetermined increment of time could be every half second, every second, every five seconds, every ten seconds, etc., so long as the data is regularly captured. Once the data is collected, it is populated into a table.

Figure 4:
FIG. 4 depicts an exemplary table for identifying a cell site whose synchronization has failed, in accordance with an embodiment of the present invention.

An exemplary table is illustrated in FIG. 4 and is generally referenced herein as numeral 400. Table 400 includes various columns, including a first column that identifies the sites from which the data is associated, initial measured data, collected data, a calculated delta, and a flag/alarm column. As shown, the table 400 is initially populated with all possibilities of site pairs. As used herein, a site pair refers to two base stations (e.g., eNodeBs) that can hear each other or that can listen to one another to determine or capture each other's synchronization data. The initial measured data, as used herein, may be control data that is compared to the collected data. For instance, the initial measured data may be phase offset data collected from the eNodeBs in the network when all eNodeBs were known to be in sync with other eNodeBs, such that it was known that a GPS signal was being received for synchronization purposes at each eNodeB. As such, it is generally known that the initial measured data can be reliably compared to the collected data to determine if and when a site is out of sync. The initial measured data, in one embodiment, is fixed but, in another embodiment, may be periodically updated to account for minor changes or variations in conditions that could affect signal, frequency, or phase data.

As mentioned, the current synchronization data may be periodically captured by the server 232 of FIG. 2. The server 232 may populate a table, such as table 400, with the captured data so that the captured data can be compared to the initial measured data. In one instance, the difference between the captured data and the initial measured data is calculated to determine a change, or delta, in these values. For instance, when there is a synchronization issue with one of the eNodeBs in the network, the phase offset may be higher or lower than the initial measured data, and thus the delta values could be positive or negative. In this instance, the absolute value is used to determine whether a synchronization failure has occurred, instead of the delta being positive or negative. The delta is sequentially or simultaneously calculated for each pair of base stations. For example, using table 400 as an example, the delta for site pair A-B would be calculated, and then the algorithm would run through the rest of the table to calculate all of the deltas for the different site pairs or combinations.

There may be several different ways for the server 232 to make the determination that a particular eNodeB has a synchronization failure. For instance, in one embodiment, upon the first delta being above a predetermined threshold, an alarm could be set off to indicate that an action is to be taken with respect to the eNodeB. Alternatively, the server 232 could raise a flag for the first delta that is above a predetermined threshold and continue computing and analyzing the deltas in the table. Here, an alarm may not be set off until two or more flags are raised. For example, if a flag is raised for site pair A-B, an alarm may not be set off until another flag has been raised for site A or site B. This may assist in determining whether site A or site B is experiencing the synchronization failure.

An example will be provided to further explain how a particular site is detected to have a synchronization failure. In this example, the calculated delta for site pair B-C is above a predetermined threshold, and therefore, a flag is raised. An indication that a flag has been raised could be illustrated in the flag/alarm column of table 400 of FIG. 4. The algorithm of server 232 then calculates the deltas for the other site pairs in the table 400. In this example, the algorithm calculates the deltas in order down the table. As such, after the delta for site pair A-B has been calculated, the delta for site pair B-C is calculated, and so on. In this example, a flag has been raised for site pair B-C. This indicates to an operator that either site B or site C has an issue with its synchronization. The other deltas calculated for these sites would include site pair A-B, site pair B-A, site pair C-B, site pair A-C, and site pair C-A. If site C has the synchronization failure, it would be expected and likely that the deltas for site pairs C-A and A-C would also be above a predetermined threshold, but the deltas for site pairs A-B and B-A would not be above a predetermined threshold. In this example, the delta for site pair C-A also raises a flag, which can be indicated in the flag/alarm column. In this example, an alarm is set off based on just the deltas from site pair B-C and site pair C-A being above a predetermined threshold. It could then be determined that site C has the synchronization failure.

In one instance, such as in embodiment illustrated in table 400 of FIG. 4, each base station (e.g., eNodeB) may be associated with multiple site pairs. For instance, if each site illustrated in FIG. 2 is capable of capturing each other's synchronization data, each site is associated with four site pairs (A-B, A-C, B-A, C-A), meaning that site A's synchronization data was used in the computation of the four different sets of synchronization data transmitted to the server 232. As such, in one embodiment, a first site pair and a second site pair, both being associated with site A, may have deltas above a predetermined threshold before it is determined that site A has a synchronization failure. In another embodiment, a first site pair, a second site pair, and a third site pair, all being associated with site A, may have deltas above a predetermined threshold before it is determined that site A has a synchronization failure. In other embodiments, higher quantities of site pairs may have deltas above a predetermined threshold before it is determined that a particular site has a synchronization failure. Additionally, as discussed, more than one consecutive or non-consecutive set of synchronization data sent to the server 232 may indicate a synchronization failure of a particular base station before it is determined that the particular base station has a synchronization failure.

In other embodiments, the algorithm may require three or more deltas associated with the same site to be above the predetermined threshold before an alarm is set off. For example, the algorithm may require that site pairs B-C, C-A, and A-C have deltas that exceed the predetermined threshold. Even further, the algorithm may require that multiple sets of collected data be analyzed and be consistent prior to an alarm being set off. For example, an action, such as an alarm, may not be taken until two or more consecutive sets of collected data indicate that a particular eNodeB has a synchronization failure, based on the calculated delta values.

The deltas may be evaluated based on value (e.g., absolute value) or percent difference. For example, the delta value could be measured in one or more different ways and units, such as, for example, in time (e.g., 1 millisecond, 5 nanoseconds), degrees, frequency, etc. Alternatively, the delta could be expressed in terms of a percentage difference between the collected data and the corresponding initial measured data. As such, if the delta is above a certain percentage (e.g., 0.01%, 0.1%, 0.5%, 1%, 5%), the server 232 may determine that a flag should be raised for that particular site pair.

As mentioned, once the server 232 detects that one of the eNodeBs in the network has a synchronization failure, an alarm may be set off, indicating that a problem is occurring with that eNodeB. The alarm may prompt an action to be taken in relation to that eNodeB, such as, for example, a command to shut down the eNodeB that is identified as having the synchronization failure. The eNodeB could be shut down based on this command initiated from the server 232, or the command could be sent to another network component that has the capability of shutting down the eNodeB.

While embodiments described above provide for the base stations (e.g., eNodeBs) to make the phase offset calculation between two base stations, in alternate embodiments, this calculation may actually be made by the server 232. For example, instead of a base station sending the server 232 a phase offset, which could be a single value, the base station could send the server 232 its own frequency and the frequency associated with a neighboring base station such that the server 232 would calculate the phase offset. Further, in one embodiment, the base stations and the server 232 temporarily store the values discussed herein. For instance, the server 232 may store the collected data and delta values until that data has been replaced by current collected data and current calculated delta values. However, the server 232 may store the initial measured data on a less temporary basis, or until the data is no longer required.

In one embodiment, a table is not populated, but instead the server 232 receives the synchronization data from the base stations and calculates the delta values for each site pair without the use of a table.

Figure 3:
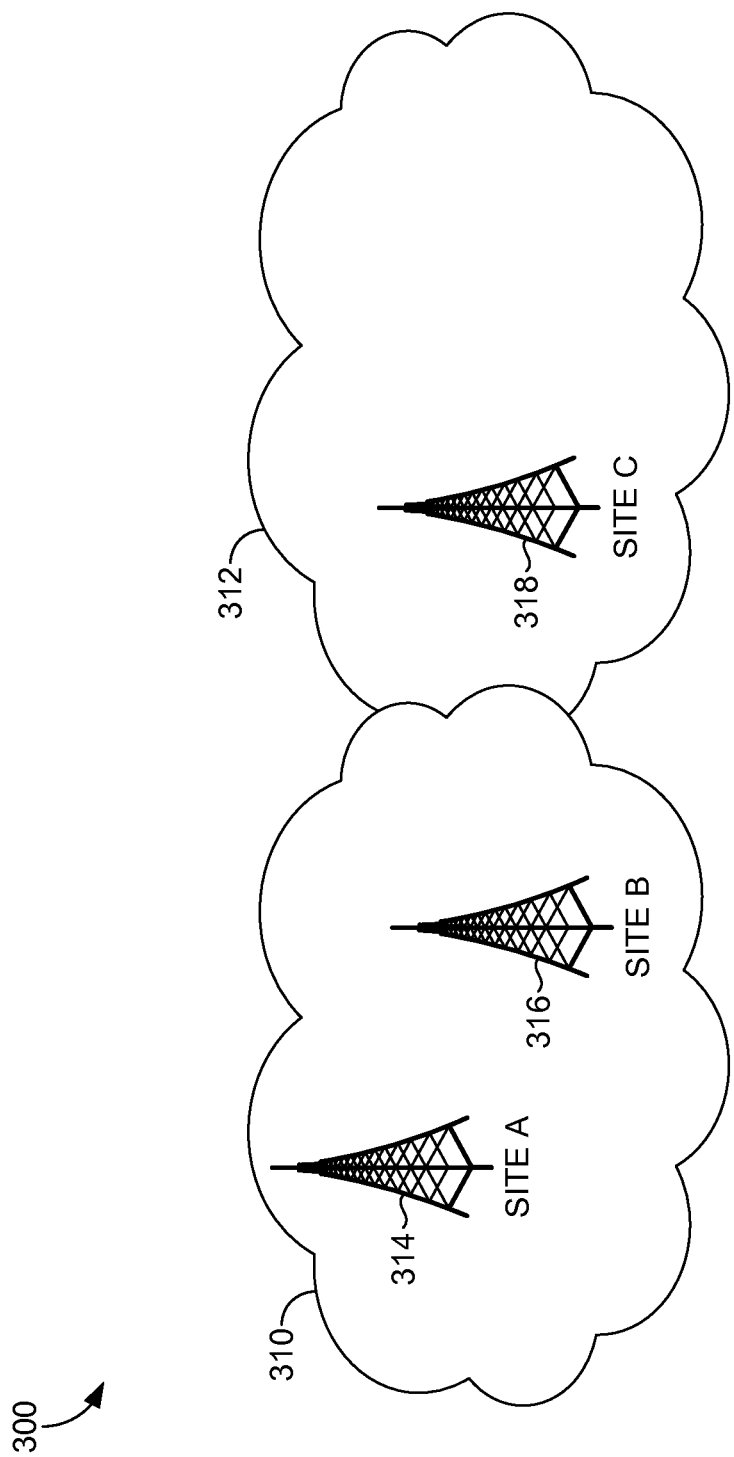
FIG. 3 depicts another exemplary networking environment having a first service provider's network and a second service provider's network, in accordance with an embodiment of the present invention.

Turning now to FIG. 3, an alternative exemplary networking environment is depicted and is generally referred to herein as numeral 300. The exemplary networking environment 300 of FIG. 3 is shown having a first service provider's network 310 and a second service provider's network 312, in accordance with an embodiment of the present invention. The previous discussions of exemplary networking or operating environments describe the eNodeBs as being located within a single network, such as being operated by a single service provider. In some instances, however, service providers have agreements with other service providers for use of their cell towers for handoffs, such as in roaming situations. In these situations, base stations, such as those base stations associated with cell tower 314 and cell tower 316 in a first or home network 310, may be able to retrieve synchronization data from a neighboring base station, such as a base station associated with cell tower 318, even if that base station associated with cell tower 318 is in a second or foreign network 312 and is operated by a second service provider. While the base station associated with cell tower 318 in the second network 312 may not provide data directly to the server, such as server 232 of FIG. 2, the synchronization data from this base station would be sent to the server 232 by way of a base station in the first network 310, such as the base stations associated with cell tower 314 or cell tower 316.

If it is determined that the base station associated with the second service provider has a synchronization failure, an operator may have the opportunity to inform the second service provider that there is an issue with that base station. Alerting the second service provider as to this issue may help the first service provider in that fewer dropped calls may occur if the frequency issue of the foreign base station is quickly resolved.

Figure 5:
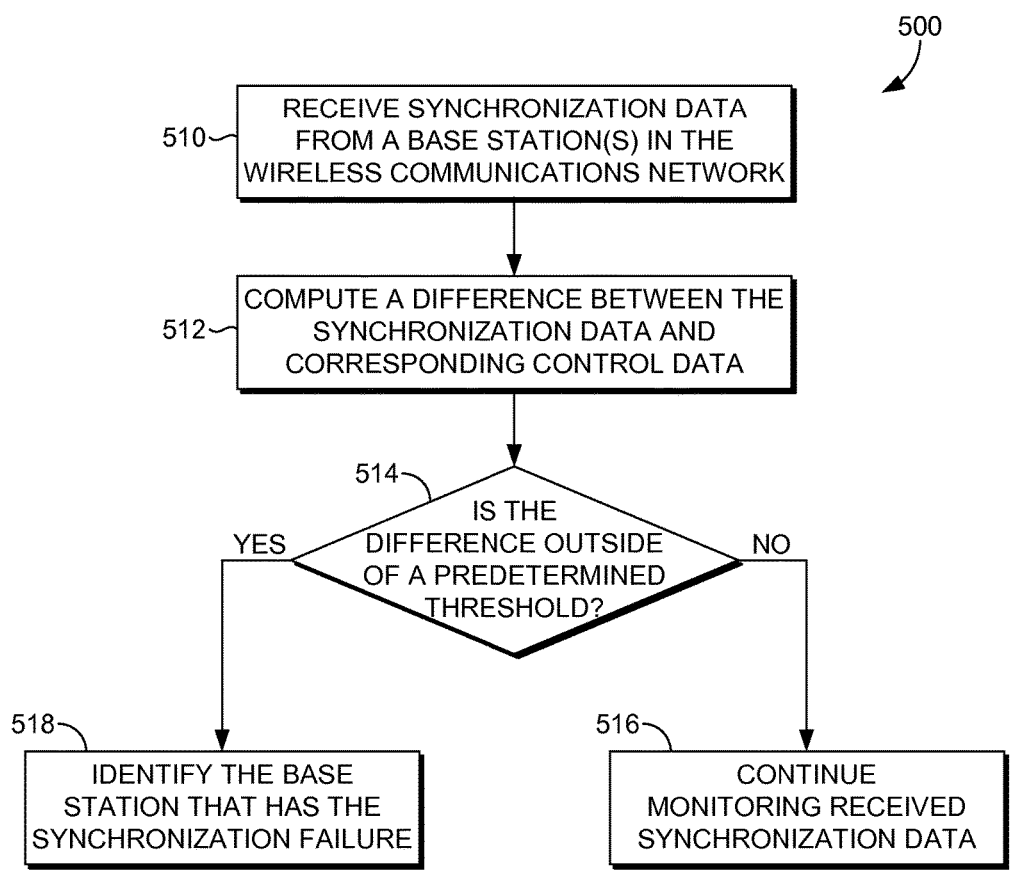
FIGS. 5-7 depict flow charts of methods for detecting a synchronization failure of a base station in a wireless communications network, in accordance with embodiments of the present invention.

FIG. 5 depicts a flow chart of a method 500 for detecting a synchronization failure of a base station in a wireless communications network, in accordance with an embodiment of the present invention. Initially at step 510, synchronization data is received from a base station in the wireless communications network. The synchronization data may be received at a server in the wireless communications network. Synchronization data, as used herein, may include frequency and/or phase data received from one or more base stations, phase offset data, signal data, or the like. For instance, the phase offset may comprise a phase shift in signals between two base stations. In one embodiment, synchronization data received comprises phase offset data between two base stations, such as two base stations that are close enough in distance so that they are able to listen to one another and to retrieve each other's phase/frequency data. Each base station may provide separate synchronization data to the server. Each phase offset data may comprise the phase offset between the base station from which the data was received and another base station that can share its synchronization data with the other base station. These two base stations are referred to herein as a site pair.

At step 512, a difference between the synchronization data and the corresponding control data is computed. The difference is referred to herein as a delta. The control data is data retrieved from the base stations when it is known that the GPS signals are being received at each of the base stations, and as such, the base stations are synchronized to one another. In one embodiment, when the synchronization data is received at the server, the data is populated into a table, which may also include the control data and the differences, or deltas, calculated from the received synchronization data and the corresponding control data.

At step 514, it is determined whether the computed difference is outside of a predetermined threshold. As mentioned, the threshold may be a value, or it may be a percentage difference. If a value, the predetermined threshold may be any type of data in any type of unit, such as time, frequency, degrees, etc. If the difference is outside of a predetermined threshold, the base station that has the synchronization failure is identified at step 518. This process is detailed above with respect to FIG. 4. Once a base station has been identified as having a synchronization failure, an alarm may be set off, which could cause a command to shut down the base station that is identified as having the synchronization failure. The alarm might be caused or set off by the server, or it might be set off by another network component. If the difference is not outside of a predetermined threshold, the received synchronization data continues to be received on a periodic basis and continues to be monitored, shown at step 516.

In one embodiment, the server receives a first set of data from a first base station, a second set of data from a second base station, and a third set of data from a third base station. The first set of data comprises the phase offsets between the first base station and the second base station, and between the first base station and the third base station. Likewise, the second set of data comprises the phase offsets between and second and first base stations, and between the second and third base stations. Similarly, the third set of data comprises the phase offsets between the third and first base stations, and between the third and second base stations. The phase offset for the first and second base stations may be received from the first base station if the first and second base stations are close enough in distance that they are capable of communicating with one another. As such, if two base stations are not close enough in distance to communicate so that one can listen for synchronization data from the other, the phase offset for those base stations would not be available, and thus would not be sent to the server. As described in relation to FIG. 3, even though a base station may be located in a foreign network, synchronization data for that base station may be retrieved by a base station in the home network, and thus, synchronization data sent to the server by the first, second, or third base stations may include data from a fourth base station in a different wireless communications network.

Figure 6:
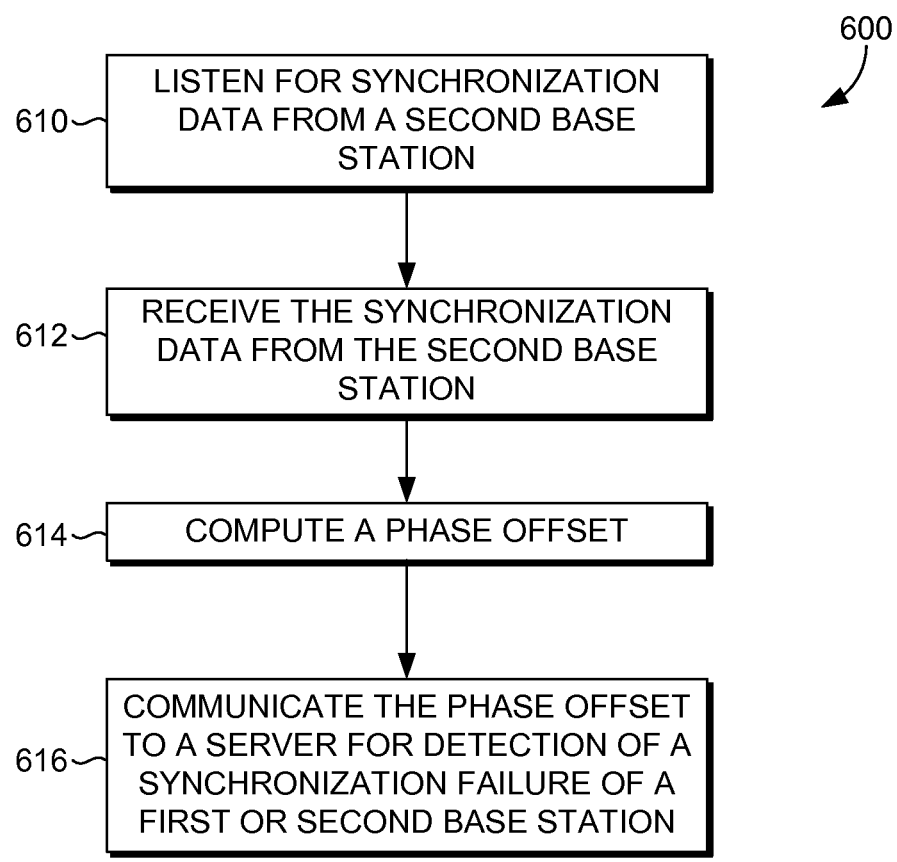

FIG. 6 depicts a flow chart of a method 600 for detecting a synchronization failure of a base station in a wireless communications network, in accordance with an embodiment of the present invention. In one embodiment, a base station performs the steps of method 600. At step 610, a first base station listens for synchronization data from a second base station. As mentioned, the second base station is geographically located at a certain distance from the first base station so that the first base station is within listening range of the second base station. At step 612, the first base station receives the synchronization data from the second base station. The first base station computes a phase offset at step 614 based on the received synchronization data. In one embodiment, the computing step comprises knowing the frequency from both the first and the second base stations and, from that, computing the phase offset. The phase offset might be a phase shift in signals between the first and second base stations. At step 616, the first base station communicates the phase offset between the first and second base stations to a server for detection of a synchronization failure of at least the first or second base stations. In one embodiment, the communication of the phase offset to the server is done in response to a request for this data from the server. This data may be requested by the server at regular intervals of time, such as every 1 second, 5 seconds, 10 seconds, etc.

Figure 7:
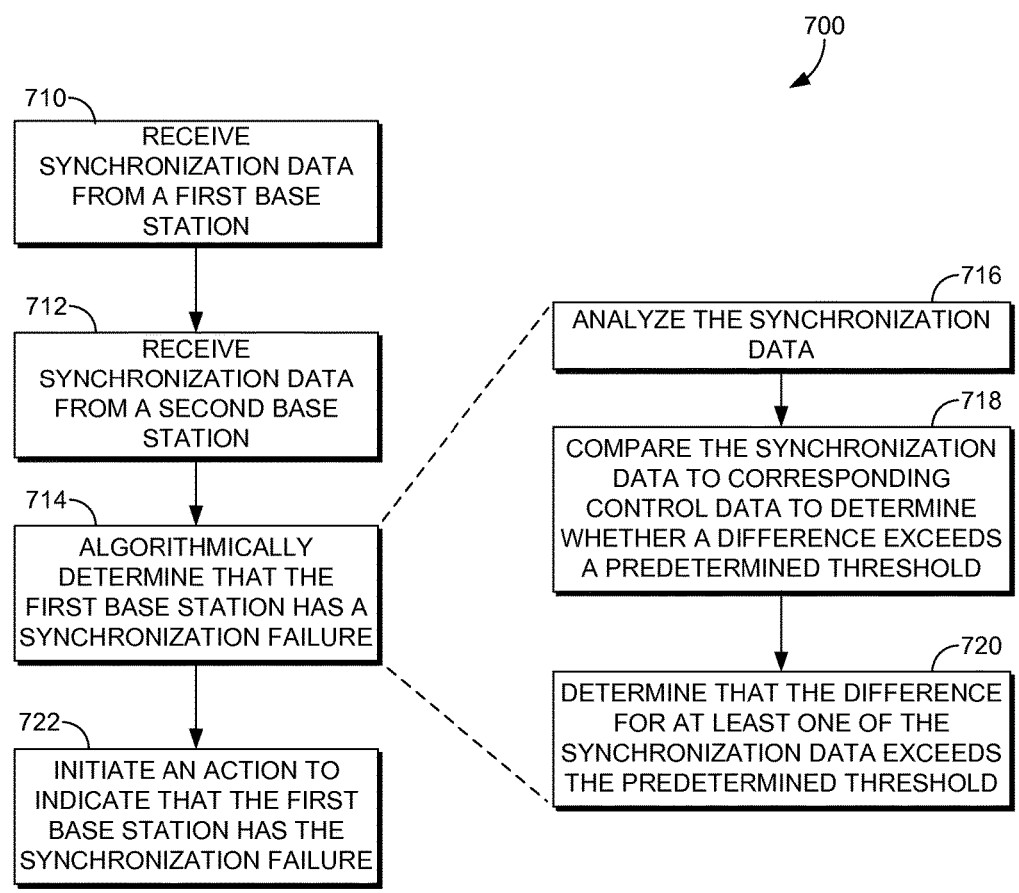

Referring to FIG. 7, a flow chart of a method 700 for detecting a synchronization failure of a base station in a wireless communications network is depicted, in accordance with an embodiment of the present invention. At step 710, synchronization data from a first base station is received, such as at a server in the wireless communications network. The first base station may be capable of determining a phase offset between, at least, the first base station and a second base station. The first base station may retrieve or measure a relative frequency from the second base station in order to determine the phase offset between the two base stations. At step 712, synchronization data is received from a second base station. The second base station, like the first base station, might be capable of determining the phase offset between, at least, the second base station and the first base station. It is algorithmically determined at step 714 that the first base station has a synchronization failure. The algorithmic determination of step 714 comprises an analysis of the synchronization data, shown at step 716. It also comprises comparing the synchronization data to the corresponding control data to determine whether a difference between the data exceeds a predetermined threshold, shown at step 718. The control data is synchronization data taken from the base stations when there are no known synchronization failures of the first and second base stations, such as when GPS signals are normally being received by these base stations. This may occur when there are no antenna failures or other types of failures that would contribute to a synchronization failure. Further, the algorithmic determination comprises determining that the difference for at least one of the synchronization data exceeds the predetermined threshold, shown at step 720. At step 722, an action is initiated to indicate that the first base station has a synchronization failure. In one embodiment, the action is a command to shut down the first base station for having been identified as having a synchronization failure. As described herein, the alarm may not be set off or an action may not be taken until two or more of the differences between at least two of the synchronization data associated with a particular base station and the corresponding control data exceed the predetermined threshold associated with that base station.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method comprising:
    at the first base station, generating a cancellation signal using signals output by the first base station over a downlink band;
    using the cancellation signal, cancelling antenna overload at the first base station resulting from the signals output by the first base station;
    at the first base station, receiving signals output by a neighboring base station over the downlink band as enabled by cancelling the antenna overload, wherein the signals output by the neighboring base station include synchronization information of the neighboring base station; and
    at the first base station, determining whether the first base station and the neighboring base station are synchronized with one another based on the synchronization information in the signals output by the neighboring base station over the downlink band.

2. The method of claim 1, wherein generating the cancellation signal further comprises:
    generating the cancellation signal to have an amplitude that is inverse to an amplitude of the signals output by the first base station over the downlink band.

3. The method of claim 1, wherein generating the cancellation signal further comprises:
    generating the cancellation signal in near real time to the output of the signals by the first base station over the downlink band.

4. The method of claim 1, wherein generating the cancellation signal further comprises:
    in near real time, generating the cancellation signal to be is in-phase with the signals output by the first base station over the downlink band.

5. The method of claim 1, wherein receiving the signals output by a neighboring base station over the downlink band further comprises:
    receiving signals output by a plurality of neighboring base stations over the downlink band.

6. The method of claim 5, wherein determining whether the first base station and the neighboring base station are synchronized further comprises:
    determining whether the first base station is synchronized with each of the plurality of neighboring base stations based on the synchronization information in the signals output by the plurality of neighboring base station over the downlink band.

7. The method of claim 1, wherein cancelling receipt of the signals at the first base station further comprises:
    cancelling receipt of each of the signals individually.

8. The method of claim 1, wherein cancelling receipt of the signals at the first base station further comprises:
    cancelling receipt of the signals as aggregated into a total signal output of the first base station.

9. The method of claim 1, wherein the first base station and the neighboring base station operate in a Frequency Division Duplex (FDD) telecommunications network.

10. One or more non-transitory computer-readable media having computer-executable instructions embodied thereon that, when executed, perform a method for detecting synchronization failures between base stations in a wireless communications network, the method comprising:
    at each of a plurality of base stations:
    generating a cancellation signal that is in-phase relative to signals output over a downlink band by a first base station and that has an inverse amplitude relative to the signals output over the downlink band by the first base station;
    internally cancelling receipt, in near real time at the first base station, of the signals output over the downlink band by the first base station using the cancellation signal;
    listening for synchronization information output by a neighboring base station over the downlink band as enabled by the signal receipt cancellation;
    when synchronization information output over the downlink band by the neighboring base station is received at the first base station, communicating the synchronization information of the neighboring base station and synchronization information of the first base station to a server for detection of synchronization failures.

11. The media of claim 10, wherein the synchronization information received over the downlink band by the first base station is output by a plurality of neighboring base stations.

12. The media of claim 10, wherein the synchronization information output by the neighboring base station over the downlink band is intended for receipt by one or more user devices in range of the neighboring base station.

13. The media of claim 10, wherein the cancellation signal is generated in near real time relative to the output of the signals over a downlink band by the first base station.

14. The media of claim 10, further comprising:
    receiving a notification from the server that a synchronization failure is detected for the first base station.

15. The media of claim 14, further comprising:
    upon receipt of the notification from the server, updating the synchronization information of the first base station using the synchronization information of the neighboring base station.

16. A system comprising:
    a plurality of base stations, each base station having an antenna, wherein each base station is configured to:
    generate a cancellation signal using signals output by a first base station over a downlink band;
    cancel antenna overload at the first base station using the cancellation signal;
    receive signals output by a neighboring base station over the downlink band as enabled by cancellation of the antenna overload, wherein the signals output by the neighboring base station include synchronization information of the neighboring base station; and
    detect whether the base station and the neighboring base station have experienced a synchronization failure using the synchronization information in the signals output by the neighboring base station over the downlink band,
    wherein at least one of the plurality of base stations is further configured to communicate synchronization information of the at least one base station to the server for detection of synchronization failures; and
    a server configured to detect synchronization failures of the plurality of base stations.

17. The system of claim 16, wherein each base station of the plurality is further configured to:
   listen for synchronization information output by neighboring base stations, wherein the neighboring base stations are within range of the base station.

18. The system of claim 16, wherein the at least one of the plurality of base stations is further configured to:
   communicate synchronization information of the at least one base station to the server for detection of synchronization failures when the at least one base station is not within range of other neighboring base stations.

19. The system of claim 16, wherein when the server detects synchronization failures at the at least one base station, the server is further configured to:
   communicate up-to-date synchronization information to the at least one base station, wherein the up-to date synchronization information is obtained by the server from another base station that is out of range of the at least one base station.

20. The system of claim 16, wherein each base station of the plurality is further configured to:
   when a synchronization failure is detected by the base station, retrieve up-to-date synchronization information from at least the neighboring base station; and
   update synchronization information of the base station using the synchronization information retrieved from the neighboring base station.

* * * * *